United States Patent
Hoff et al.

(10) Patent No.: US 12,546,302 B2
(45) Date of Patent: Feb. 10, 2026

(54) COMPRESSOR, DISC BODY AND SEAL

(71) Applicants: STASSKOL GMBH, Stassfurt (DE);
NEUMAN & ESSER GMBH & CO. KG, Übach-Palenberg (DE)

(72) Inventors: Klaus Hubert Hoff, Aachen (DE); Uwe Morawa, Langenweddingen (DE); Marc Langela, Güsten (DE)

(73) Assignees: STASSKOL GMBH, Stassfurt (DE);
NEUMAN & ESSER GMBH & CO. KG, Ubach-Palenberg (DE)

( * ) Notice: Subject to any disclaimer, the term of this patent is extended or adjusted under 35 U.S.C. 154(b) by 86 days.

(21) Appl. No.: 18/268,417

(22) PCT Filed: Dec. 14, 2021

(86) PCT No.: PCT/EP2021/085597
§ 371 (c)(1),
(2) Date: Nov. 27, 2023

(87) PCT Pub. No.: WO2022/136014
PCT Pub. Date: Jun. 30, 2022

(65) Prior Publication Data
US 2024/0392768 A1 Nov. 28, 2024

(30) Foreign Application Priority Data
Dec. 21, 2020 (DE) .......................... 102020134381.7

(51) Int. Cl.
*F04B 39/04* (2006.01)
*F16J 15/00* (2006.01)
(Continued)

(52) U.S. Cl.
CPC ........... *F04B 39/041* (2013.01); *F16J 15/006* (2013.01); *F16J 15/164* (2013.01); *F16J 15/26* (2013.01)

(58) Field of Classification Search
CPC ........ F04B 39/041; F04B 37/12; F04B 39/04; F04B 39/0005; F16J 15/006; F16J 15/164;
(Continued)

(56) References Cited

U.S. PATENT DOCUMENTS 1,636,012 A * 7/1927 Olson ......................... F16J 9/20
277/464
1,778,200 A * 10/1930 Nibbs ......................... F16J 9/08
277/928

(Continued)

FOREIGN PATENT DOCUMENTS

| AT | 15687 B | 3/1904 |
|---|---|---|
| CH | 439897 A | 7/1967 |

(Continued)

OTHER PUBLICATIONS

Japanese Office Action for family member Application No. 2023-561427 dated Oct. 6, 2025.
(Continued)

*Primary Examiner* — Kenneth J Hansen
*Assistant Examiner* — Benjamin Doyle
(74) *Attorney, Agent, or Firm* — Hudak, Shunk & Farine Co. LPA

(57) ABSTRACT

A compressor having a stationary part and a part oscillating along a main axis (X) as well as a leakage path (L) extending between the stationary part and the oscillating part in the axial direction, wherein multiple chambers, which are arranged axially in succession and extend annularly around the main axis (X), are defined between the stationary part and the oscillating part, wherein a seal, which closes or reduces the leakage path (L) is arranged in at least one chamber. The compressor has at least one bypass which fluidically interconnects two chambers.

16 Claims, 7 Drawing Sheets

(51) Int. Cl.
*F16J 15/16* (2006.01)
*F16J 15/26* (2006.01)

(58) Field of Classification Search
CPC ...... F16J 15/26; F16J 9/22; F16J 15/56; F16J 9/08; F02F 3/00
USPC ....... 277/457, 465, 515, 464, 447; 92/162 R, 92/182, 159, 250–253
See application file for complete search history.

(56) References Cited

U.S. PATENT DOCUMENTS

| | | | | |
|---|---|---|---|---|
| 1,781,183 A * | 11/1930 | Lewis | ........................ | F16J 9/08 |
| | | | | 277/467 |
| 1,923,573 A * | 8/1933 | Wenzel | .................... | F16J 9/203 |
| | | | | 277/463 |
| 2,356,909 A * | 8/1944 | Aske | .......................... | F16J 9/08 |
| | | | | 277/467 |
| 2,610,098 A * | 9/1952 | Reiners | ...................... | F16J 9/08 |
| | | | | 277/467 |
| 2,615,769 A * | 10/1952 | Barnes | ....................... | F16J 1/02 |
| | | | | 92/DIG. 1 |
| 2,619,392 A * | 11/1952 | Brown | ........................ | F16J 9/00 |
| | | | | 277/467 |
| 2,666,678 A * | 1/1954 | Carney | ....................... | F16J 9/08 |
| | | | | 92/155 |
| 2,861,852 A * | 11/1958 | Olsen | ........................ | F16J 9/20 |
| | | | | 417/372 |
| 3,132,568 A * | 5/1964 | Strader | ..................... | F16J 10/02 |
| | | | | 92/252 |
| 3,194,568 A * | 7/1965 | Payne | ................... | F04B 39/041 |
| | | | | 277/514 |
| 3,334,906 A * | 8/1967 | Arnold | ................... | F16J 15/006 |
| | | | | 277/927 |
| 3,386,346 A * | 6/1968 | Halpin | ....................... | F16J 9/00 |
| | | | | 92/183 |
| 3,400,941 A * | 9/1968 | Hutto | ....................... | F16J 9/203 |
| | | | | 123/195 P |
| 3,544,118 A * | 12/1970 | Klein | ..................... | F16J 15/006 |
| | | | | 277/927 |
| 3,620,137 A * | 11/1971 | Prasse | ....................... | F02F 1/10 |
| | | | | 123/193.2 |
| 3,687,577 A * | 8/1972 | Henry | .................... | F16J 15/162 |
| | | | | 417/437 |
| 4,280,455 A * | 7/1981 | Yamaguchi | ............... | F02F 1/20 |
| | | | | 123/41.39 |
| 4,359,229 A * | 11/1982 | Cattaneo | .................... | F16J 9/00 |
| | | | | 267/1.5 |
| 4,474,106 A * | 10/1984 | Durenec | .................... | F16J 9/08 |
| | | | | 92/159 |
| 5,347,915 A * | 9/1994 | Feistel | ....................... | F16J 9/20 |
| | | | | 92/241 |
| 9,027,934 B2 * | 5/2015 | Lindner-Silwester | ... | F16J 15/24 |
| | | | | 277/558 |
| 2014/0000549 A1 * | 1/2014 | Graczyk | ................. | F16J 9/206 |
| | | | | 92/169.1 |

FOREIGN PATENT DOCUMENTS

| | | |
|---|---|---|
| DE | 489885 C | 1/1930 |
| DE | 638505 C | 11/1936 |
| DE | 1260249 B | 2/1968 |
| DE | 9190040 U1 | 3/1992 |
| DE | 102010034870 A1 | 2/2012 |
| JP | 54122406 U | 8/1979 |
| JP | 59222673 A | 12/1984 |
| JP | 6088844 A | 5/1985 |
| KR | 20010065988 A | 12/1999 |
| KR | 20090108925 A | 10/2009 |
| WO | 9841749 A1 | 9/1998 |
| WO | 2020157141 A1 | 8/2020 |

OTHER PUBLICATIONS

EP Notice of Opposition for corresponding EP Patent 4,264,050 dated Nov. 3, 2025.
EP Notice of Opposition for corresponding EP Patent 4,264,050 dated Nov. 5, 2025.

* cited by examiner

COMPRESSOR, DISC BODY AND SEAL

FIELD OF THE INVENTION

The present invention relates to a compressor, a disc body, a seal, as well as their use in a compressor.

BACKGROUND OF THE INVENTION

Piston compressors conventionally comprise a piston having a piston rod connected to the piston. The piston oscillates within a sleeve and typically comprises multiple piston rings acting as seals that seal the high-pressure side, i.e., the compression space, from the low-pressure side, i.e., where the piston rod begins.

A seal in the form of a piston rod packing is also generally arranged on the piston rod. The piston rod packing comprises multiple chamber discs axially bordering each other and forming chambers, within which seals having one or more sealing rings are arranged. The sealing rings likewise seal a high-pressure side, on which the piston is situated, from a low-pressure side, on which the compressor drive is situated.

A sealing packing for piston rods is known from U.S. Pat. No. 3,544,118. DE 91 90 040 U1 and DE 10 2010 034 870 A1 disclose seals from the combustion engine field.

Piston compressors can be used to compress hydrogen. The compression of hydrogen is necessary, e.g., for hydrogen filling stations. For example, the pressures required thereby can be 400 bar for buses and 900 bar for cars.

When refuelling, the purity of the hydrogen is of particular importance. The use of lubricants can contaminate the hydrogen, which is undesirable. Preferably, unlubricated piston compressors are therefore used (dry running without lubricants).

However, the high pressure differences and the dry running lead to very high wear. This applies to both the piston rings arranged on the piston and the sealing rings within the piston rod seals. The materials used for seals have what is referred to as a pv limit. At high pressure differences (p) and/or high speeds (v), a limit exists, above which the wear increases disproportionately. Achieving or exceeding this limit is therefore undesirable.

Given the high pressure differences in the area of hydrogen refuelling, the speed of the piston is thus limited, resulting in long refuelling times.

SUMMARY OF THE INVENTION

The object of the invention was to create an option for enabling a compression of gases at high pressure differences and high speeds.

This object is achieved by means of a compressor having a stationary part, a part oscillating along a main axis (X), and a leakage path (L) extending between the stationary part and the oscillating part in the axial direction, wherein multiple chambers, which are arranged axially in succession and extend annularly around the main axis (X), are defined between the stationary part and the oscillating part, wherein a seal, which closes or reduces the leakage path (L), is arranged in at least one chamber, and wherein at least one bypass is provided, which fluidically interconnects two chambers.

The compressor comprises a stationary part and a part oscillating along the main axis, as well as a leakage path extending between the stationary part and the oscillating part in the axial direction. Multiple chambers, which are arranged axially in succession in an annular manner around the main axis, are defined between the stationary part and the oscillating part. Arranged in at least one chamber is a seal, which closes or reduces the leakage path, i.e., reduces or prevents leakage along the leakage path. The compressor is characterised by at least one bypass being provided, which fluidically interconnects two chambers.

The compressor is in particular a piston compressor.

The leakage path is generally present because the stationary and oscillating parts are not touching. The seals reduce leakage along the leakage path, whereby the focus of development up to now has been to reduce leakage more and more. In conventional piston rod seals, starting from the high-pressure side, the reduction of the dynamic pressure fraction occurs primarily at the first seal, and the reduction of the static pressure fraction occurs primarily at the last seal. The piston rings on a piston behave in a similar manner. The first and the last seals are thus subjected to the greatest stresses.

The inventors have recognised that, in particular in the case of high pressure differences, it is preferable to distribute the pressure difference (the difference between the high-pressure side and the low-pressure side) more homogeneously across the individual seals via a sealing arrangement, i.e., an arrangement of multiple seals within multiple chambers arranged axially in succession. As a result, the pressure difference per seal (pressure difference in front of and behind the seal) in the first and the last seals is reduced. As a result, the compressor can be designed so that none of the seals reach the pv limit when used as intended. In the invention, therefore, the leakage path itself is still sealed as well as possible and, at the same time, a specifically defined bypass is provided within the framework of the design enabling a predefined leakage.

The homogeneous pressure distribution is thus achieved by means of a targeted leakage via the bypass or bypasses between the individual chambers of the compressor. The bypasses are designed such that a homogeneous pressure distribution via the sealing arrangement is established.

The invention can be used for the sealing arrangement on a piston of a compressor, as well as in a piston rod packing of a compressor. Accordingly, the stationary part can be a sleeve and the oscillating part can be a piston. Alternatively, the stationary part can be a packing housing and the oscillating part can be a piston rod.

For a homogeneous pressure distribution, it is preferable for the bypass to fluidically interconnect two immediately adjacent chambers. Respective leakage between the neighbouring chambers takes place thereby, as a result of which the pressure difference is evenly distributed across all seals.

Since leakage is actually undesirable, only just as much leakage as is necessary for the predefined, partial pressure compensation is permitted through the bypass. Leakage through the bypass is in particular defined by the minimum cross-section thereof, i.e., the cross-section at the narrowest point. It has been shown that a minimum cross-section of $M<2$ mm$^2$, in particular $M<1.5$ mm$^2$, is preferable, in particular in the area of application at pressure differences of $>300$ bar. Preferably, the minimum cross-section is $M>0.1$ mm$^2$.

Bypasses can be provided in the stationary part, in particular the packing housing, or provided in the oscillating part, in particular the piston, or even in the seals. In the seals, in particular, the introduction of bores and/or millings in the sealing rings or in support rings is conceivable, thus enabling targeted leakage between the chambers. As mentioned hereinabove, it is preferred that the bore or milling not be arranged in the region of the leakage path. If a seal is provided with a bypass, the seal is preferably made of a rigid material (e.g., plastics having an elastic modulus of >5000 MPa and/or metals) in order to achieve the targeted leakage.

The bypass is provided in particular in addition to the leakage path. In other words, the bypass is provided at a location where no portion of the leakage path is formed. On a sealing ring, for example, a portion of the leakage path is formed on the radial sealing surface, since there can be little leakage in that location. In such a case, the bypass could, e.g., preferably occur transversely through the sealing ring, but not in the region of the sealing surface.

The bypass is preferably formed from at least one bore. A bore can be precisely adjusted in terms of its size, so that it is basically possible to define the minimum cross-section, and thus the leakage, by the diameter of the bore alone. At the same time, a bore is comparatively easy to manufacture, so the cost of manufacture of the compressor does not increase significantly. A single bore can generally also be formed in several drilling operations and then, e.g., comprise a kink. Thus, a bore need not necessarily be straight.

The piston can be either what is referred to as a built piston or a piston having a one-piece piston body. A built piston comprises multiple disc bodies in the form of piston discs, which are arranged axially in succession and which together, optionally supplemented by further disc bodies, form the piston body. The piston body preferably comprises a cylindrical core in both the integral and the built forms, and a plurality of annular projections extending about the core, between which radially outwardly directed grooves are formed for the seals. The grooves are partially sealed by the sleeve, the remaining gaps forming portions of the leakage path. Together with the sleeve, the grooves thereby form the chambers for the seals.

The piston rod packing is generally "built" and then comprises multiple disc bodies in the form of chamber discs arranged axially in succession, each comprising a central bore and forming the packing housing through which the piston rod extends. The chamber discs form multiple radially inwardly directed grooves that are partially closed by the piston rod, the remaining gaps again forming portions of the leakage path. Together with the circumferential surface of the piston rod, the grooves in this case form the chambers for the seals.

The disc bodies can be screwed together.

Accordingly, in advantageous embodiments the piston or the packing housing comprises multiple disc bodies arranged axially in succession, the disc bodies comprising a first axial surface and a second axial surface arranged opposite the disc body, as well as a radial surface, and the bore extending between the first axial surface and the radial surface and/or between the first axial surface and the second axial surface. The radial surface is an inner radial surface in the case of the packing housing, or an outer radial surface in the case of the piston. The radial surface can also be the groove base of the grooves formed, which can then also be referred to as the chamber bases of the chambers formed.

Multiple bores can also be provided, which are situated in different components.

Particularly in the case of seals and disc bodies, at least portions of the bore preferably extend parallel to the main axis, which simplifies the manufacture of the bore.

If the piston comprises a cylindrical core and a plurality of annular protrusions extending circumferentially about the core, at least portions of the bore preferably extend through the core. In this way, for example, two groove bases of adjacent chambers can be connected to one another via drilling through the core. Particularly preferably, the bore extends through the centre of the piston, thus crossing the main axis.

In some embodiments, the bypass is provided directly in the region of the leakage path, particularly in the form of a groove. Such bypasses can be provided in particular in the disc bodies, especially preferably in the area of a sealing surface. The sealing surface is then preferably level, and the bypass is a groove. Preferably, the corresponding sealing surface of the seal is also level. Preferably, the sealing surface/s extend perpendicular to the main axis. The groove preferably extends perpendicular to the main axis. If, as described hereinabove, a cut-out is provided in the seal, then progressive wear of the seal will gradually cause the bypass to become smaller and smaller. A groove in the low-wear sealing partner (the disc body) will not become smaller over time, or will only become slightly smaller. A bypass in the disc body in the area of the leakage path, in particular in the sealing surface, thus retains its predefined cross-section over a long period of time. The groove thus represents a preferred embodiment of a bypass.

The desired minimum cross-section of the bypass is very small. Manufacturing a bore with such a cross-section is technically challenging, in particular due to the ratio between its length and its diameter. In advantageous embodiments, therefore, a restrictor is arranged in the bore or in the groove, which restrictor defines a minimum cross-section M of the bypass. In this case, the bore itself need not be particularly narrow and can then be produced more easily. Preferably, the restrictor does not extend the entire length of the bore, which results in a more favourable length to diameter ratio of a restrictor bore provided in the restrictor, which can then easily be manufactured in a fine mechanical manner. Particularly preferably, the restrictor is a screw connection having an aperture plate, which is screwed into the bore, or an insert having an aperture plate, which is inserted into the groove. A hole with a very small cross-section can be produced in an aperture plate particularly easily.

The restrictor can also comprise a porous material. The porous material and the diameter of the bore or the cross section of the groove are then formed to together yield the desired minimum cross section.

The higher the pressure difference of two adjacent chambers, the smaller the bypass should be, since even a smaller bypass is sufficient for a pressure alignment at higher pressure differences. Therefore, advantageous embodiments provide multiple bypasses, in which case of two adjacent bypasses, the bypass that is arranged closer to the high-pressure side of the compressor comprises a minimum cross section M, which is smaller than or equal to the minimum cross-section M of the bypass, which is arranged closer to a low-pressure side of the compressor. In other words, the bypasses, starting from the high-pressure side and going towards the low-pressure side, become larger or remain at least the same. Particularly preferably, the bores of the bypasses are uniform and in particular identical, and the differences in the bypasses are achieved by the restrictor used in each case. The restrictors are in particular designed differently and comprise in particular different minimum cross sections.

The object of the invention is also achieved by means of a disc body which is designed for use in a compressor and comprises a first axial surface, a second axial surface arranged opposite to the disc body, as well as a radial surface and characterised by a bypass extending between the first axial surface and the radial surface and/or between the first axial surface and the second axial surface. The radial surface is in particular an inner radial surface or an outer radial surface. Preferably, the bypass of this disc body is a bore.

The object of the invention is also achieved by means of a disc body which is designed for use in a compressor and comprises an inner radial surface and an outer radial surface, a bypass extending between the inner radial surface and an outer radial surface. The bypass of this disc body is preferably a groove.

The disc body can further be further formed in the manner described hereinabove with respect to the compressor.

The object of the invention is also achieved by means of a seal designed for use in a compressor, having a first axial end surface, a second axial end surface, a radially inward surface, and a radially outward surface, through which a bypass extends between at least two of said surfaces, i.e., the first axial end surface, the second axial end surface, the radially inward surface, and the radially outward surface.

The seal can further be further designed in the manner described hereinabove with respect to the compressor.

The object of the invention is also achieved by the use of a disc body or seal according to the description hereinabove in a compressor, preferably a piston compressor, in particular a compressor according to the description hereinabove.

BRIEF DESCRIPTION OF THE DRAWINGS

The invention is described and explained hereinafter by way of examples with reference to the drawings. Shown are.

DETAILED DESCRIPTION OF THE INVENTION

Figure 1:
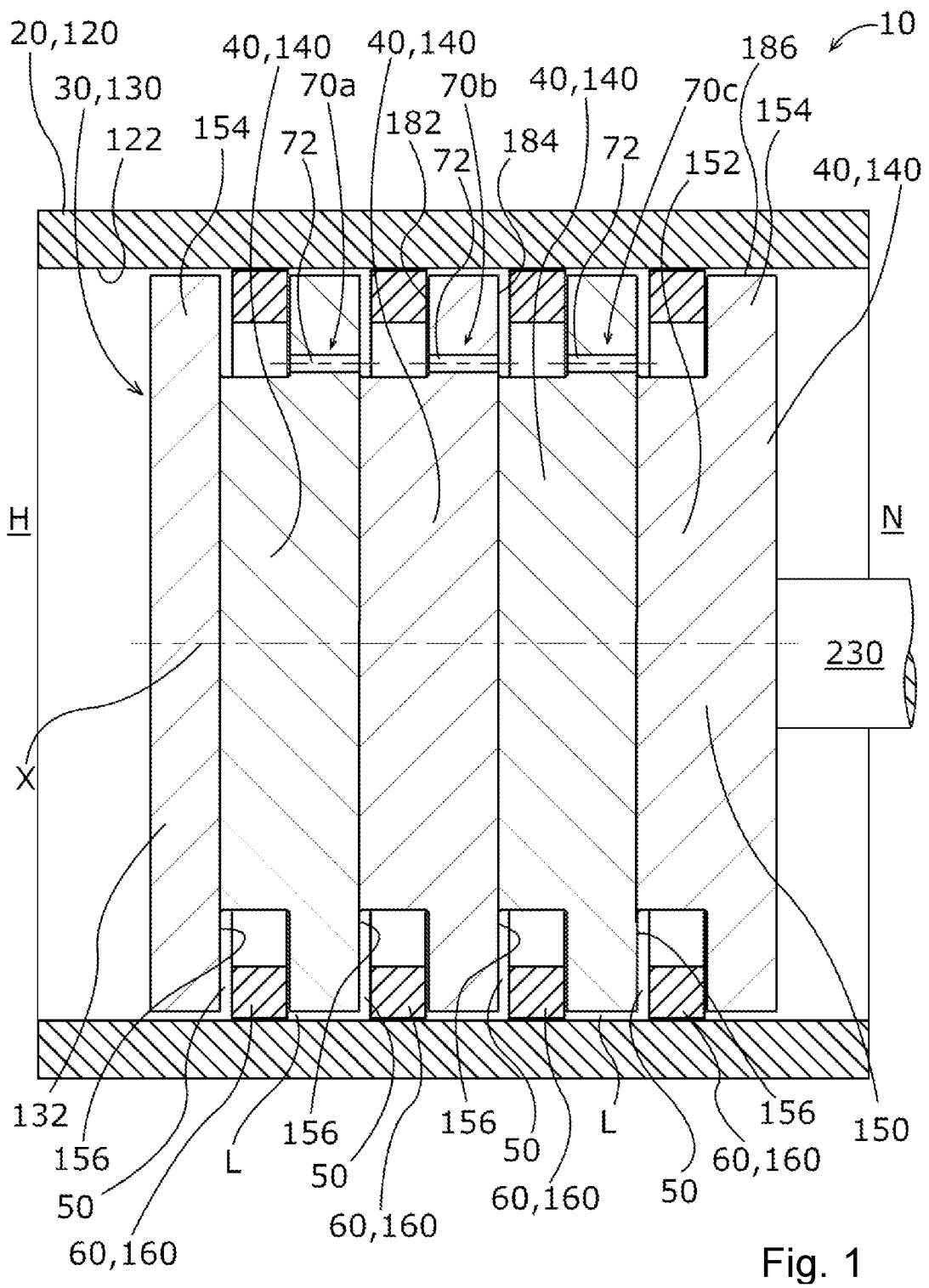
FIG. 1 a detail of a first embodiment of a compressor in a sectional view.

The compressor 10 shown in the detail in FIG. 1 comprises a sleeve 120 as a stationary part 20 and a piston 130 as an oscillating part 30. The piston 130, when used as intended, oscillates along a main axis X relative to the sleeve 120 between a high-pressure side H and a low-pressure side N.

The sleeve 120 comprises a sliding surface 122, which is an inward cylindrical peripheral surface.

The piston 130 is what is referred to as a built piston 130. The piston 130 comprises multiple disc bodies 40, i.e., a base plate 132 and multiple piston discs 140 arranged axially in succession. The piston 130 is connected to a piston rod 230. Together with the base plate 132, the piston discs 140 form a piston body 150. The piston body 150 comprises a cylindrical core 152 and a plurality of annular protrusions 154 extending circumferentially around the core 152. A plurality of grooves 156 are formed between the protrusions 154, each groove 156 being formed by either two piston discs 140 or by a piston disc 140 and the base plate 132. The grooves 156 are partially sealed by the sleeve 120, thereby forming the piston body 150 and, along with the sleeve 120, multiple axially arranged, successive chambers 50 extending around the main axis in an annular manner. The sleeve 120 does not in this case contact the piston body 150. As a result, there remains an axial direction leakage path L between the sleeve 120 and the piston 130.

Leakage along the leakage path L is generally undesirable, but it usually cannot be completely avoided. However, leakage can be minimised. For this purpose, a seal 60 is arranged in each chamber 50, which seal closes or reduces the leakage path L. The illustrated embodiment relates to piston rings 160 in the seals 60, which are shown in a simplified manner in this case. Depending on the direction in which the piston 130 is moving at a given time, the piston rings 160 border either the high-pressure side or the low-pressure side flank of the grooves 156 and seal the leakage path L in that location.

In conventional sealing arrangements having piston rings 160, starting from the high-pressure side H, the dynamic pressure fraction at the first seal 60 and the static pressure fraction at the last seal 60 are reduced. To avoid this, three bypasses 70a,b,c are provided in addition to the leakage path L. Each bypass 70a,b,c fluidically interconnects two immediately adjacent chambers 50.

The bypasses 70a,b,c each comprise a bore 72 that extends parallel to the main axis X. In the illustrated embodiment, the bypasses 70a,b,c extend through the protrusions 154, i.e., from a first axial surface 182 of the piston disc 140 to a second axial surface 184 of the piston disc 140 arranged opposite. Each bore 72 thereby interconnects two adjacent chambers 50. The bores 72 are actually of a smaller diameter and are shown in an expanded manner in this case. Each piston disc 140 further comprises an outer radial surface 186.

The bypasses 70a,b,c provide the gases coming from the high-pressure side, in addition to the leakage path L, a way of flowing into the respective next chamber 50. In this way, the pressure difference between high-pressure side H and low-pressure side N is progressively and overall homogeneously reduced.

Figure 2:
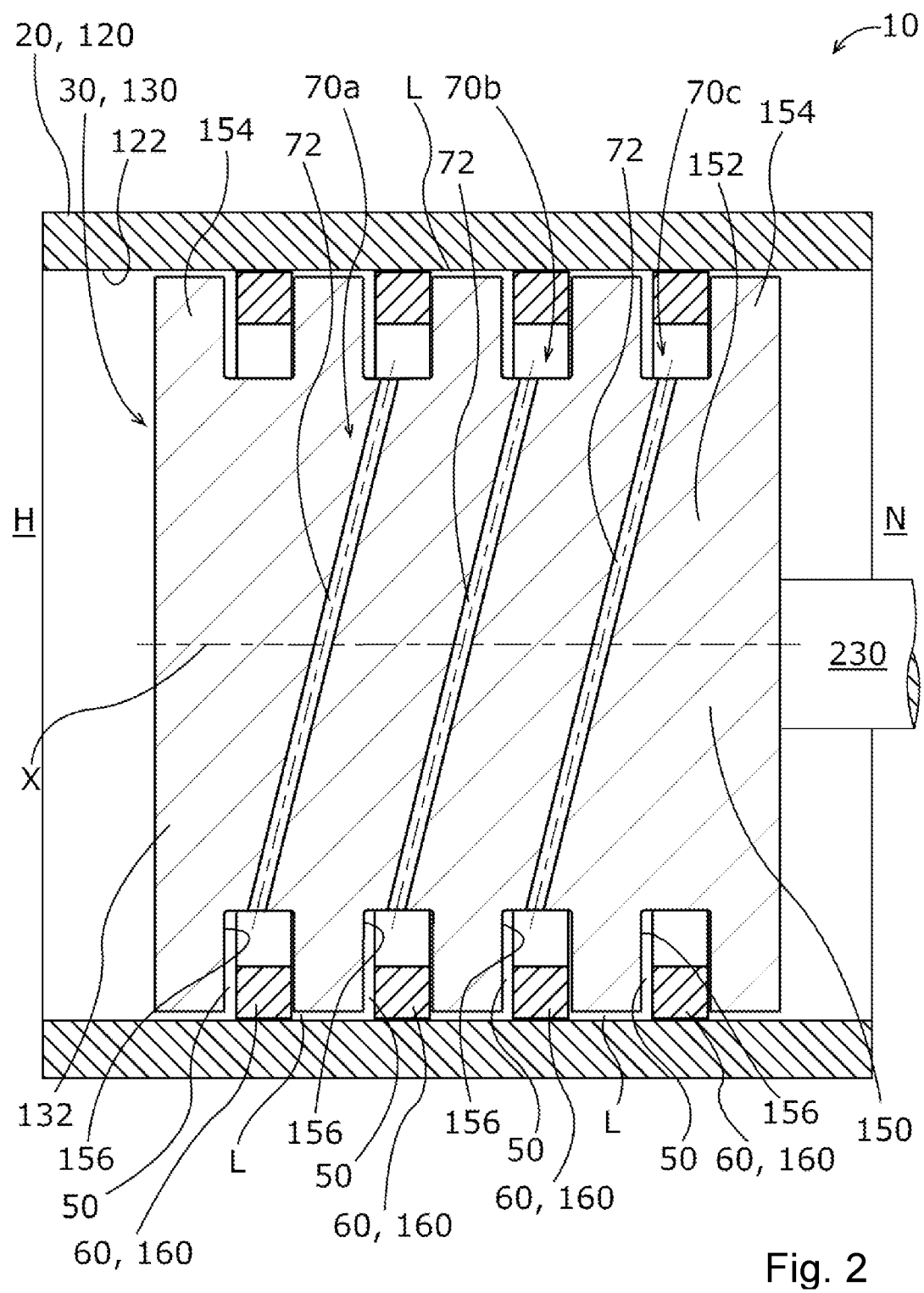
FIG. 2 a detail of a second embodiment of a compressor in a sectional view.

In the embodiment shown in detail in FIG. 2, the piston 30 comprises a one-piece piston body 150. The piston body 150 also comprises a cylindrical core 152 in this case, and a plurality of annular protrusions 154 extending circumferentially around the core 152. The design of sleeve 120, piston rod 230, and seals 60 is identical to the embodiment shown in FIG. 1.

The bypasses 70a,b,c are also formed in the embodiment shown in FIG. 2 by way of the bores 72. However, the bores 72 do not extend parallel to the main axis X. The bores 72 rather extend straight from the groove base of a groove 156 to the groove base of the adjacent groove 156. The bores 72 extend completely through the core 152 of the piston body 150. The bores in this case cross the main axis X. Adjacent chambers 50 are as a result also interconnected in this embodiment by way of the bores 72 so that a homogeneous pressure distribution over all of the seals 60 takes place.

Figure 3:
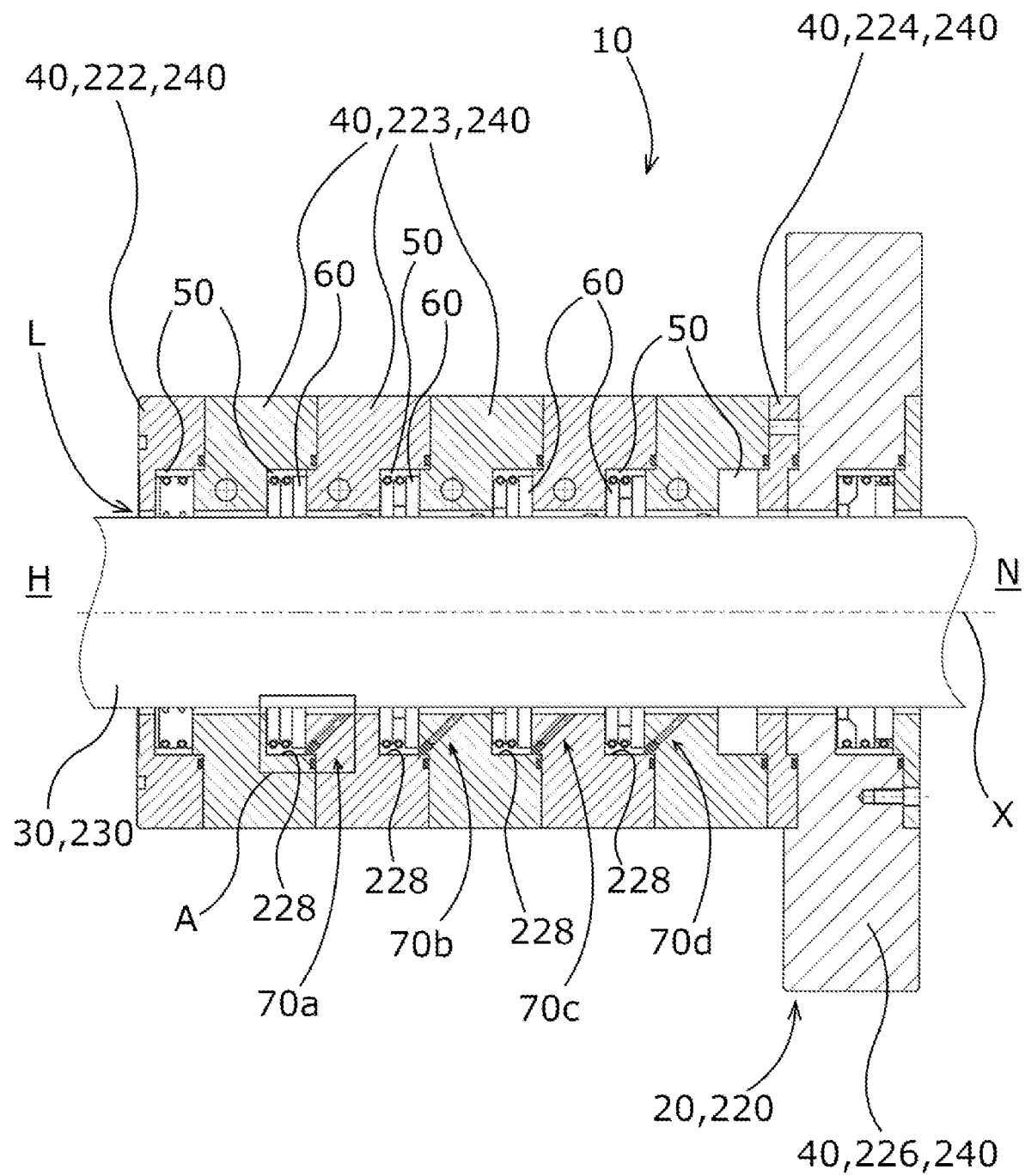
FIG. 3 a detail of a third embodiment of a compressor in a sectional view.

FIG. 3 shows a detail of a compressor 10 having a packing housing 220 as a stationary part 20 and a piston rod 230 as an oscillating part 30. The piston rod 230 oscillates relative to the packing housing 220 along a main axis X between a high-pressure side H and a low pressure side N.

The packing housing 220 comprises multiple chamber discs 240 as a disc body 40, i.e., a base plate 222, a plurality of main chamber discs 223, a cover plate 224, and an end plate 226, which are arranged adjacent one another along the main axis X in said order. The chamber discs 240 each comprise a central bore. The piston rod 230 extends through the central bores. Each of two adjacent chamber discs 240 together form a groove 228 that is radially inwardly open.

The grooves 228 of the chamber discs 240 are partially sealed by the piston rod 230. In this way, the chamber discs 240 and the piston rod 230 form multiple chambers 50 arranged axially in succession and extending annularly around the main axis, wherein a leakage path L remains between the chamber discs 240 and the piston rod 230.

Figure 3A:
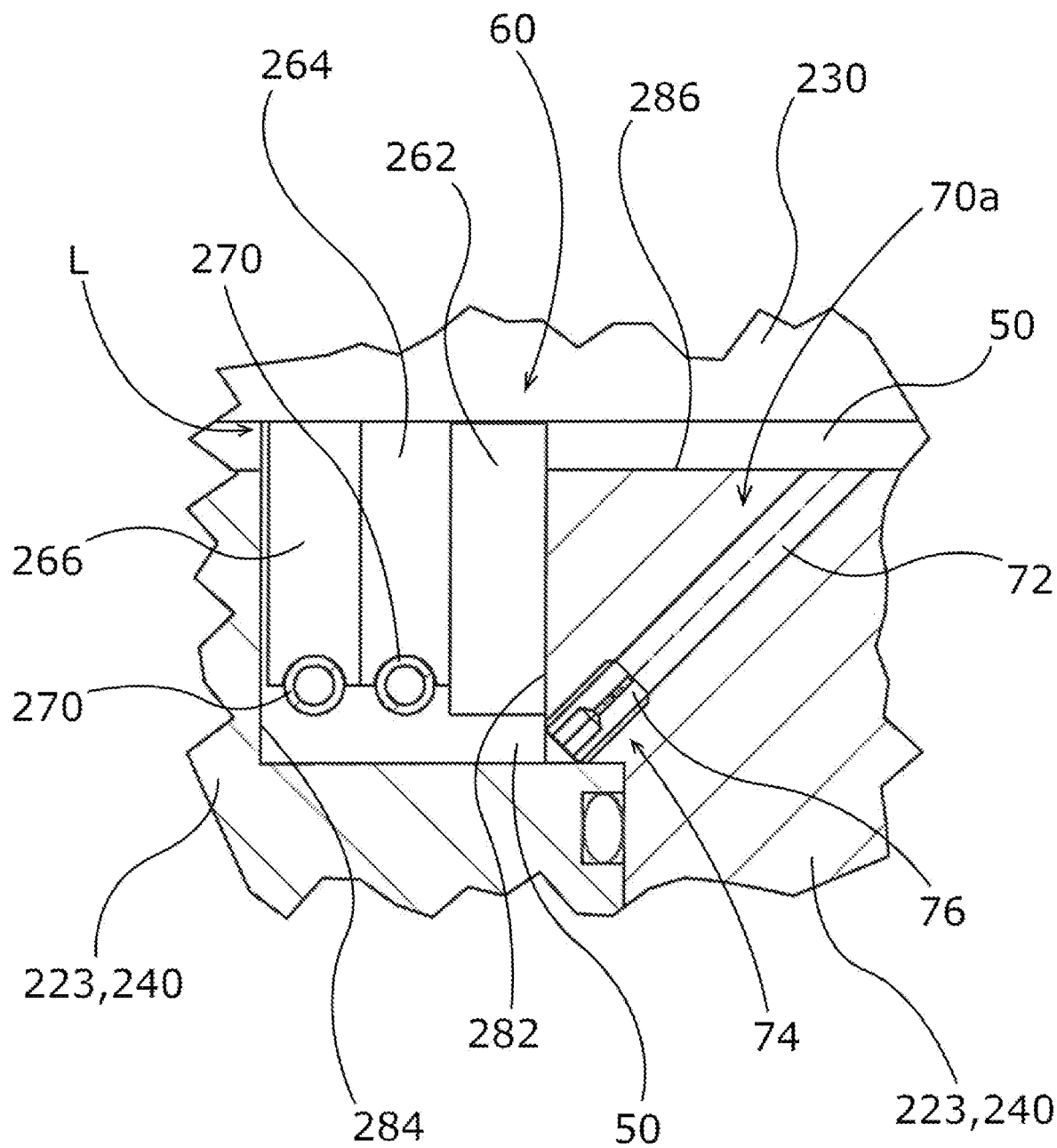
FIG. 3A the detail A shown in FIG. 3.

The chamber discs 240 each comprise a first axial surface 282 and a second axial surface 284 arranged opposite the piston disc 240, as well as an inner radial surface 286 (see FIG. 3A).

A seal 60 is arranged within four of the chambers 50. The seals 60 each comprise a support ring 262, a sealing ring 264, and a cover ring 266 (see FIG. 3A). The sealing ring 264 and the cover ring 266 are supported on the piston rod 230 by the garter springs 270. In other embodiments, the seals 60 can also be of a different construction and comprise more or fewer rings. The support ring 262 does not touch the piston rod 230 when used as intended, but is arranged at a radial distance from the piston rod 230. By means of the pressure coming from the high-pressure side H, the seal 60 is pressed against the chamber disc 240, which is situated closer to the low-pressure side N. The support ring 262 supports the seal 60 in the axial direction on the chamber disc 240.

The sealing ring 264 borders the piston rod 230 and thus seals on the leakage path L, therefore completely or partially closing the leakage path L.

In addition to the leakage path L, four bypasses 70a,b,c,d are provided, each fluidically connecting two adjacent chambers 50 (see FIG. 3). The bypasses 70a,b,c,d are formed from bores 72 (see FIG. 3A). The bores 72 extend between the first axial surface 282 and the inner radial surface 286, thereby connecting the adjacent chambers 50.

Arranged in each of the bores 72 is a restrictor 74 in the form of a screw connection having an aperture plate 76, which is screwed into the bore 72. The aperture plate 76 comprises a hole that defines the minimum cross-section of the respective bypass 70a,b,c,d. Starting from the high-pressure side H, the holes of the aperture plates 76 of the bypasses 70a,b,c,d have a diameter of 0.4 mm, 0.4 mm, 0.5 mm and 0.6 mm. The minimum cross-section from bypass 70a,b,c,d to bypass 70a,b,c,d thus always gets smaller or stays the same towards the high-pressure side H.

Figure 4:
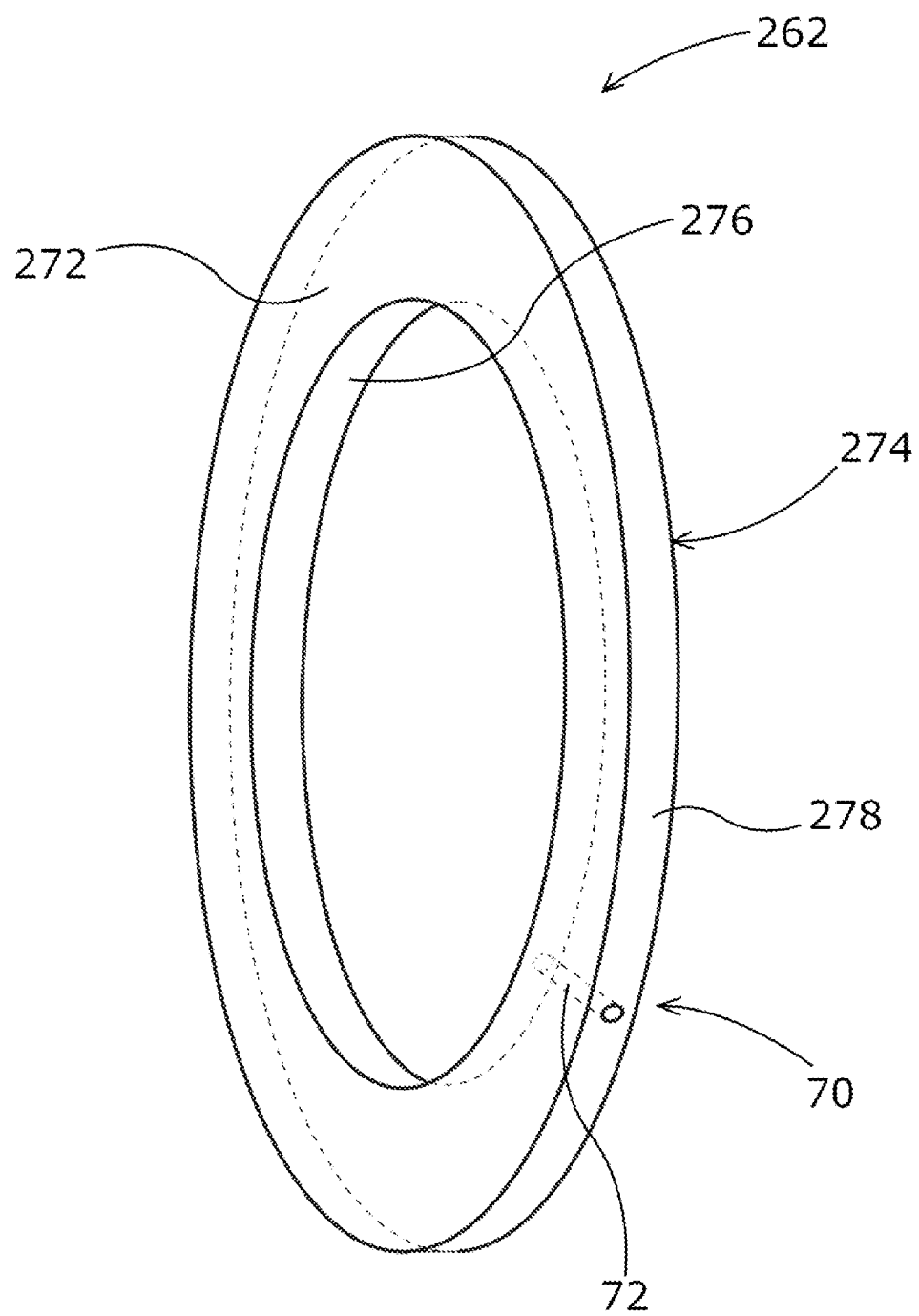
FIG. 4 a support ring for a compressor in a perspective view.

For example, the support ring 262 shown in FIG. 4 can be inserted into a piston housing 220 shown in FIG. 3. The support ring 262 comprises a first axial end surface 272, a second axial end surface 274 arranged opposite, a radially inward surface 276, and a radially outward surface 278.

The support ring 262 further comprises a bypass 70 in the form of a bore 72. The bore 72 extends radially from the radially inward surface 276 to the radially outward surface 278. When used as intended, as mentioned above, the radially inward surface 276 of the support ring 262 does not border the piston rod 230. Nor does the support ring 262 border the radially outward surface 278 on the packing housing 220. In this way, the bypass 70 of the support ring 262 also connects two adjacent chambers 50 (see FIG. 3A).

Figure 5:
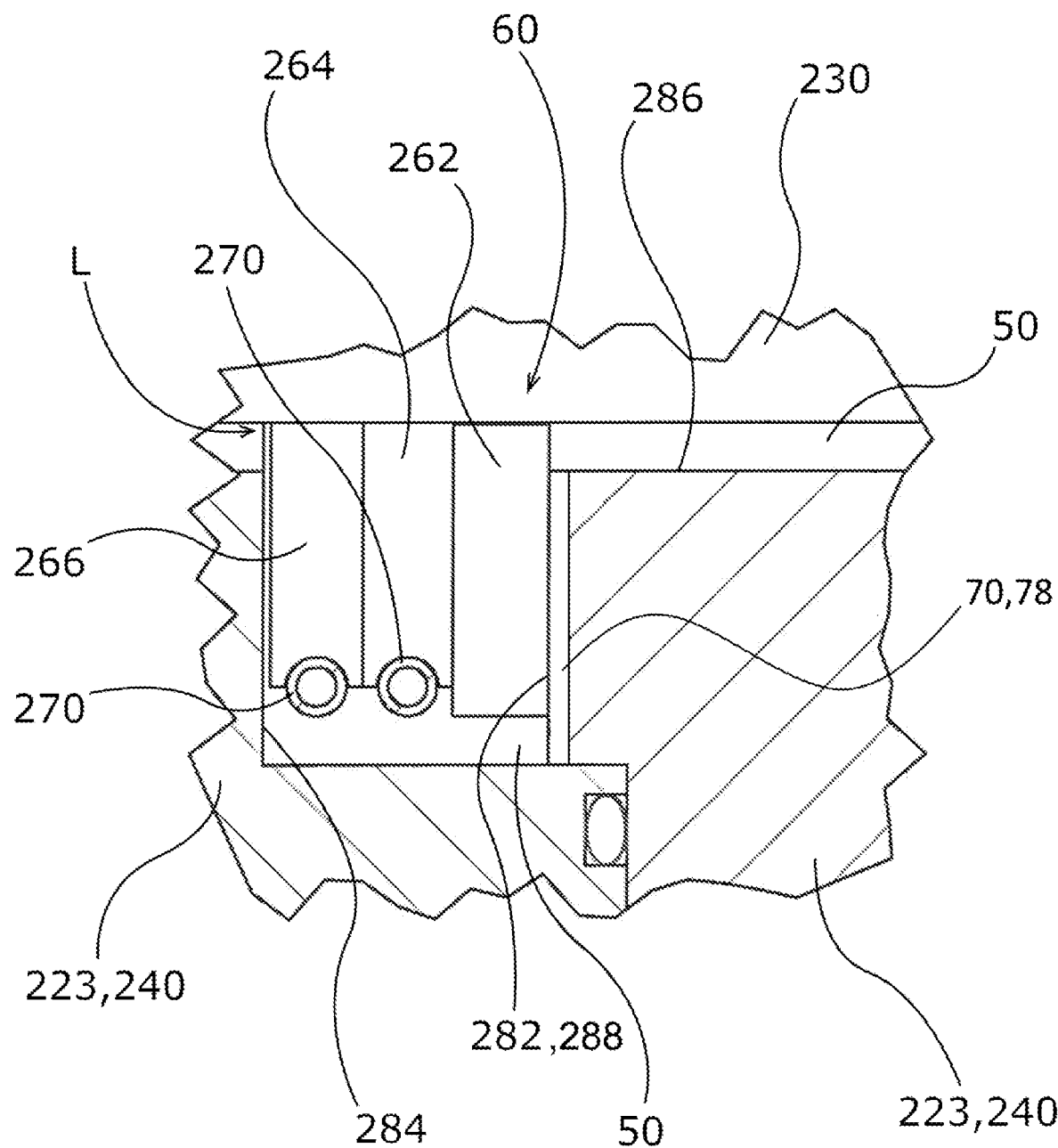
FIG. 5 a detail of a fourth embodiment of a compressor in a sectional view.

FIG. 5 shows a detail of a compressor 10, which is partially identical to the compressor 10 shown in FIG. 3. The compressor 10 comprises a packing housing 220 as a stationary part 20 and a piston rod 230 as an oscillating part 30. The piston rod 230 oscillates relative to the packing housing 220 along a main axis X between a high-pressure side H and a low-pressure side N.

The packing housing 220 comprises multiple chamber discs 240 as a disc body 40, i.e., a base plate 222, multiple main chamber discs 223, a cover plate 224, and an end plate 226, which are arranged adjacent one another along the main axis X in said order. The chamber discs 240 each comprise a central bore. The piston rod 230 extends through the central bores. Each of two adjacent chamber discs 240 together form a groove 228 that is radially inwardly open.

The grooves 228 of the chamber discs 240 are partially sealed by the piston rod 230. In this way, the chamber discs 240 and the piston rod 230 form multiple chambers 50 arranged axially in succession and extending annularly around the main axis, wherein a leakage path L remains between the chamber discs 240 and the piston rod 230.

The chamber discs 240 each comprise a first axial surface 282 and a second axial surface 284 arranged opposite the piston disc 240, as well as an inner radial surface 286.

A seal 60 is arranged within four of the chambers 50. The seals 60 each comprise a support ring 262, a sealing ring 264, and a cover ring 266 (see FIG. 3A). The sealing ring 264 and the cover ring 266 are supported on the piston rod 230 by the garter springs 270. In other embodiments, the seals 60 can also be of a different construction and comprise more or fewer rings. The support ring 262 does not touch the piston rod 230 when used as intended, but is arranged at a radial distance from the piston rod 230. The pressure coming from the high-pressure side H forces the seal 60 against the first axial surface 282 of the chamber disc 240. The first axial surface 282 thereby forms a sealing surface 288. The support ring 262 supports the seal 60 in the axial direction on the chamber disc 240.

The sealing ring 264 borders the piston rod 230 and thus seals on the leakage path L, therefore completely or partially closing the leakage path L.

Provided in the region of the leakage path L is a bypass 70 in the form of a groove 78, which fluidically interconnects two adjacent chambers 50. The groove 78 extends within the first axial surface 282, which is simultaneously the sealing surface 288. In this case, the groove 78 extends in the radial direction completely through the sealing surface 288. Even if the entire surface of the seal 60 borders the sealing surface 288, the groove 78 remains open in this manner and forms a bypass 70.

Figure 6:
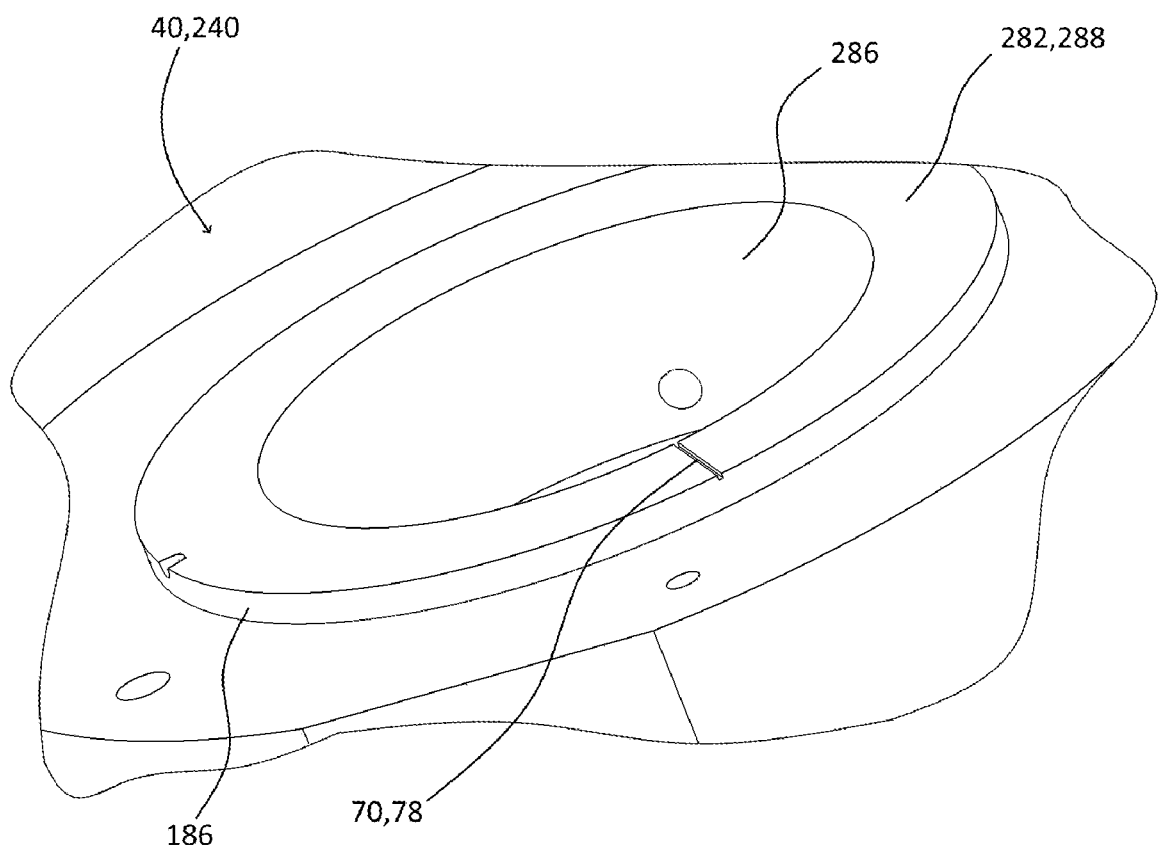
FIG. 6 in detail, a disc body in a perspective view.

The disc body 40 shown in FIG. 6 is a chamber disc 240 for a compressor (not shown in detail). The chamber disc 240 is similar in structure to the chamber disc 240 shown in FIG. 5.

The chamber disc 240 comprises a central bore enclosed by an inner radial surface 286. The chamber disc 240 further comprises a first axial surface 282 that is simultaneously a sealing surface 288 for a seal not shown. When used as intended, the seal borders the sealing surface 288.

The sealing surface 288 is arranged on an axial protrusion of the chamber disc 240. The axial protrusion comprises an outer radial surface 186.

The chamber disc 240 comprises a bypass 70 in the form of a groove 78. The groove 78 extends from the outer radial surface 186 to the inner radial surface 286. If the seal is adjacent the sealing surface 288, then gas can still flow past the seal and through the bypass 70. The size of the bypass 70 is predetermined, thereby achieving a targeted leakage.

The groove 78 extends in the radial direction, i.e., perpendicular to a main axis of the chamber disc 240.

LIST OF REFERENCE CHARACTERS

10 Compressor
20 Stationary part

30 Oscillating part
40 Disc body
50 Chamber
60 Seal
70 Bypass
70a Bypass
70b Bypass
70c Bypass
70d Bypass
72 Bore
74 Restrictor
76 Aperture plate
78 Groove
120 Sleeve
122 Sliding surface
130 Piston
132 Base plate
140 Piston disc
150 Piston body
152 Core
154 Protrusions
156 Groove
160 Piston ring
182 First axial surface
184 Second axial surface
186 Outer radial surface
220 Packing housing
222 Base plate
223 Main chamber disc
224 Cover plate
226 End plate
228 Groove
230 Piston rod
240 Chamber disc
262 Support ring
264 Sealing ring
266 Cover ring
270 Garter spring
272 First axial end surface
274 Second axial end surface
276 Radially inward surface
278 Radially outward surface
282 First axial surface
284 Second axial surface
286 Inner radial surface
288 Sealing surface
H High-pressure side
N Low-pressure side
L Leakage path
X Main axis

What is claimed is:

1. A compressor, comprising:
a stationary part,
a part oscillating along a main axis (X), and
a leakage path (L) extending between the stationary part and the oscillating part in the axial direction,
wherein multiple chambers, which are arranged axially in succession and extend annularly around the main axis (X), are defined between the stationary part and the oscillating part,
wherein a seal, which closes or reduces the leakage path (L), is arranged in at least one chamber,
wherein multiple separate, independent bypasses are provided, with each bypass fluidically interconnecting two immediately adjacent chambers,
wherein each bypass has a minimum cross-sectional area M, which is defined by the cross-sectional area at its narrowest point, and
wherein of two adjacent bypasses, the minimum cross-sectional area M of the bypass that is arranged closer to a high-pressure side (H) of the compressor is smaller than the minimum cross-sectional area M of the bypass which is located closer to a low-pressure side (N) of the compressor.

2. The compressor according to claim 1, wherein the stationary part is a sleeve and the oscillating part is a piston, or wherein the stationary part is a packing housing and the oscillating part is a piston rod.

3. The compressor according to claim 1, wherein each minimum cross-sectional area M is independently greater than 0.1 mm$^2$ and less than 2 mm$^2$.

4. The compressor according to claim 1, wherein the multiple separate bypasses are provided in the stationary part, or the oscillating part, or in the seal.

5. The compressor according to claim 1, wherein the multiple separate bypasses are provided in addition to the leakage path (L).

6. The compressor according to claim 2, wherein the multiple separate bypasses are formed from at least one bore.

7. The compressor according to claim 6, wherein the piston or the packing housing comprises multiple disc bodies, which are arranged axially in succession, wherein each disc body comprises a first axial surface and a second axial surface, the respective coaxial surfaces arranged on opposite ends of the respective disc body, as well as a radial surface, and wherein the bore extends between the first axial surface and the radial surface and/or between the first axial surface and the second axial surface.

8. The compressor according to claim 7, wherein at least portions of the bore extend parallel to the main axis (X).

9. The compressor according to claim 6, wherein the piston comprises a cylindrical core and a plurality of annular protrusions extending circumferentially around the core and in that at least portions of the bore extend through the core.

10. The compressor according to claim 2, wherein the multiple separate bypasses are provided in the region of the leakage path (L).

11. The compressor according to claim 10, wherein the multiple separate bypasses are each a groove.

12. The compressor according to claim 11, wherein the piston or the packing housing comprises multiple disc bodies, which are arranged axially in succession, wherein the disc bodies comprise a sealing surface, and wherein the groove extends within the sealing surface.

13. The compressor according to claim 6, wherein a restrictor is arranged in the bore or in a groove, which restrictor defines the minimum cross-section M of the respective bypass.

14. The compressor according to claim 13, wherein the restrictor is a screw connection having an aperture plate, which is screwed into the bore, or in that the restrictor is an insert having an aperture plate, which is inserted into the groove.

15. The compressor according to claim 13, wherein the restrictor comprises a porous material.

16. A compressor, comprising:
a stationary part,
a part oscillating along a main axis (X), and
a leakage path (L) extending between the stationary part and the oscillating part in the axial direction, wherein multiple chambers, which are arranged axially in succession and extend annularly around the main axis (X), are defined between the stationary part and the oscillating part, wherein a seal, which closes or reduces the leakage path (L), is arranged in at least one chamber, wherein at least one bypass is provided, which fluidically interconnects two chambers, wherein the stationary part is a sleeve and the oscillating part is a piston, or wherein the stationary part is a packing housing and the oscillating part is a piston rod, wherein the bypass is provided in the region of the leakage path (L), wherein the bypass is a groove, and wherein the piston or the packing housing comprises multiple disc bodies, which are arranged axially in succession, wherein the disc bodies comprise a sealing surface, and wherein the groove extends within the sealing surface.

* * * * *